United States Patent [19]

Cocca

[11] Patent Number: 5,321,455
[45] Date of Patent: Jun. 14, 1994

[54] CAMERA APPARATUS AND METHOD FOR FILM DOUBLE EXPOSURE PREVENTION

[75] Inventor: J. David Cocca, Rochester, N.Y.

[73] Assignee: Eastman Kodak Company, Rochester, N.Y.

[21] Appl. No.: 988,633

[22] Filed: Dec. 9, 1992

[51] Int. Cl.[5] .................. G03B 19/02; G03B 17/26; G03B 1/04; G03B 7/00
[52] U.S. Cl. .................. 354/207; 354/275; 354/21; 242/71.1
[58] Field of Search .......... 354/207, 275, 21; 242/71.1

[56] References Cited

U.S. PATENT DOCUMENTS

| | | | |
|---|---|---|---|
| 4,994,833 | 2/1991 | Cocca | 354/207 |
| 5,030,978 | 7/1991 | Stoneham et al. | 354/21 |
| 5,032,854 | 7/1991 | Smart et al. | 354/21 |

*Primary Examiner*—Michael L. Gellner
*Assistant Examiner*—Nicholas J. Tuccillo
*Attorney, Agent, or Firm*—Francis H. Boos

[57] ABSTRACT

Camera apparatus operative with a film cartridge having a rotatable radial bar coded data disc thereon positioned at predetermined angular settings corresponding that indicate the condition of film in the cartridge, i.e. exposed, unexposed, partially exposed, etc.. The setting of the disc is determined during initial film spool rotation during the film loading process by counting with the optical sensor in the camera the number of bar code elements occurring between the initial set position of the disc and a reference position on the disc such as an edge of a quiet zone element normally included on the radial bar coded disc. The visual exposure indicator (VEI) positions on the cartridge are spaced about the perimeter of the cartridge such that there exist unambiguous element count ranges corresponding to each of the cartridge VEI positions. Element counting for this purpose can be performed in a cameras that operate to cause initial spool rotation during a film loading operation in either an unwind or rewind direction.

4 Claims, 4 Drawing Sheets

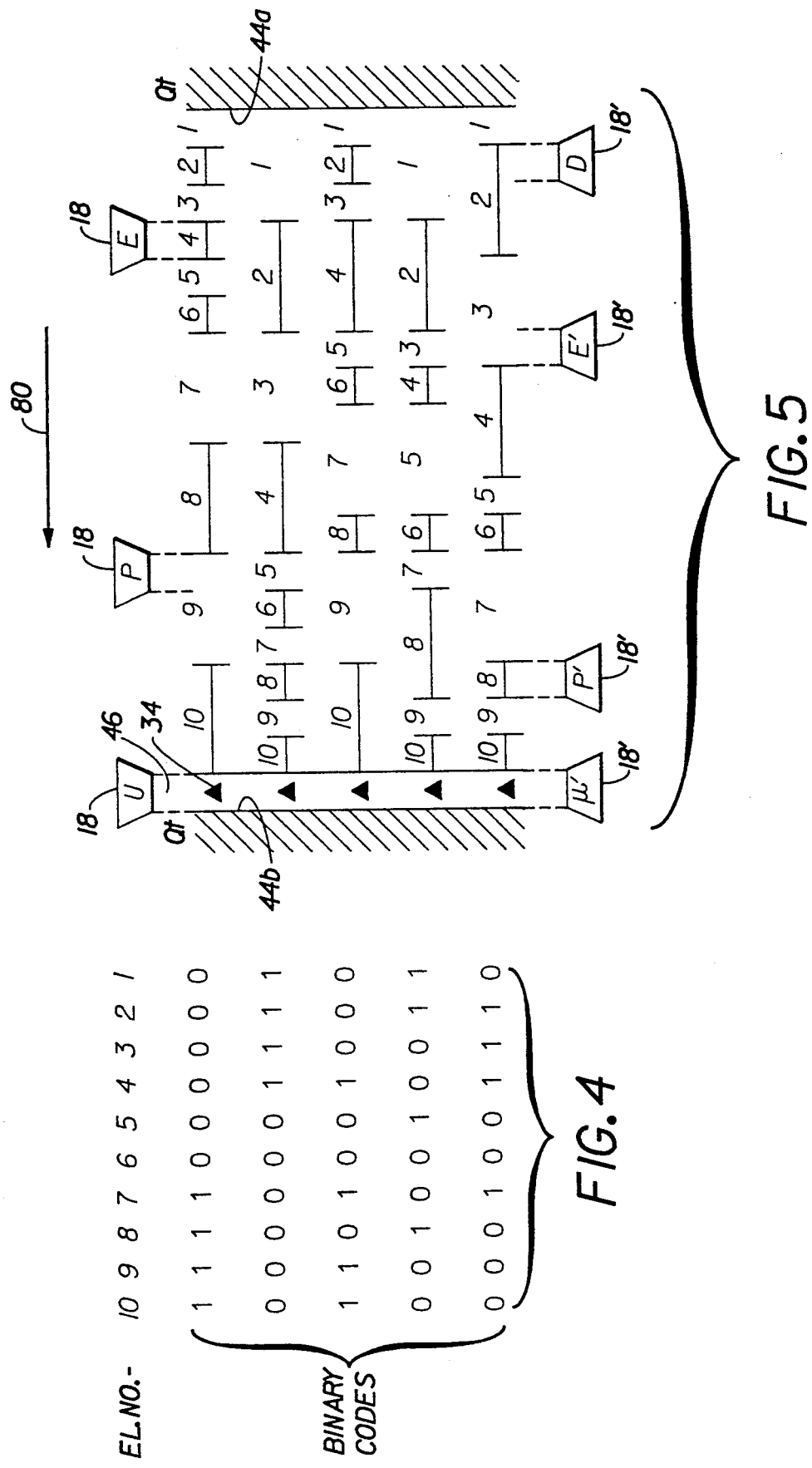

CAMERA APPARATUS AND METHOD FOR FILM DOUBLE EXPOSURE PREVENTION

FIELD OF INVENTION

This invention relates to photographic film cameras and, particularly, to a system for automatically preventing double exposure of a film in the camera.

BACKGROUND

In recent years, photographic film cartridges have been proposed in which the film strip is completely enclosed within the cartridge and the film is loaded into the camera by simply causing the cartridge film spool to be rotated in the unwinding direction. A motor drive in the camera would generally be used for this purpose. Simplicity in film loading is one reason for this arrangement.

A problem with this arrangement, however, is that, unlike prior conventional film cartridges, there is no film leader extending out of the cartridge to indicate that the film is unexposed. Consequently, arrangements have been proposed to provide a visual indication of the exposure condition of the film and also to prevent loading of exposed film into the camera. This is particularly useful if the photographer wishes to switch cartridges to a different film type midway through the film exposures in the first cartridge. Commonly assigned U.S. Pat. No. 4,994,833 and the applications cross-referenced therein are representative of such proposals. However, such arrangements have the drawback that they require specially designed cartridge configurations and special mechanical sensors built into the camera to implement the double exposure prevention.

In commonly assigned U.S. Pat. Nos. 5,030,978 and 5,032,854, film cartridges are disclosed that utilize a rotatable radial bar coded disc element to provide information about the film in the cartridge, such as film manufacturer, film type, etc.. These patents describe apparatus and methods for reading the bar codes during rewind operation to position the spool and the associated bar coded disc at a particular angular position of the spool so as to align visual indicators on the cartridge that indicate the exposure condition of the film, e.g. unexposed, partially exposed or exposed. In the '854 patent, a simple locking feature is shown that holds the spool in the desired indicator position. While useful as a visual indicator of film exposure condition, no provision is made for enabling the camera to automatically prevent reloading of exposed film or of enabling reloading of partially exposed film to an available frame position without the use of the special cartridge configuration and mechanical sensors of the types considered in aforementioned U.S. Pat. No. 4,994,833.

It is therefore considered desirable to provide camera apparatus that will cooperate with a film cartridge having a radial coded disc arrangement and that will conveniently and reliably prevent double exposure of film in the cartridge without the need for a specially designed film cartridges and costly, space consuming mechanical sensor arrangements in the camera.

SUMMARY OF THE INVENTION

In accordance with the invention therefore, camera apparatus is provided for preventing double exposure of film contained in a light-tight cartridge housing having a rotatable film spool and an externally readable bar coded medium rotatable with the spool. It is assumed that the cartridge is of the type in which, when the film is fully wound condition in the cartridge, the angular setting of the bar coded medium relative to a fixed reference position on the cartridge housing is indicative of an exposure condition of the film in the cartridge. Although this angular setting may be determined visually by means of various indicia on the cartridge, it becomes necessary that the camera apparatus be capable of automatically determining this setting to perform double exposure prevention in the camera. For this purpose therefore, camera apparatus of the invention is provided which comprises a film cartridge receiving chamber and an optical bar code sensor located in the cartridge receiving chamber at a predetermined angular position relative to the reference position on the film cartridge housing when the cartridge is placed in the receiving chamber. The camera further includes means for initiating rotation of the spool as part of a film loading operation in the camera. The camera further includes means responsive to the bar code sensor when the rotation is initiated for counting the number of radial bar code elements occurring between the sensor and a predetermined reference position on the bar coded medium and means for determining from the element count the initial angular setting of the bar coded medium relative to the fixed reference position on the cartridge housing. Finally, the camera includes means for implementing a predetermined control effect on the film loading operation, the particular control effect being dependent on the determined initial angular setting of the bar coded medium, such that positioning of an exposed frame on the film in a film exposure chamber of the camera is prevented.

In the method of the invention automatic sensing of an initial angular setting of a rotatable bar coded medium on a film cartridge in a camera to prevent double exposure of film in the cartridge after loading into the camera is achieved by initiating rotation of the bar coded medium as part of a film loading operation in the camera, sensing bar code elements of the bar coded medium when the rotation is initiated and counting the number of elements sensed until a predetermined reference position on the bar coded medium is reached. The method further includes the steps of determining from the element count an initial angular setting of the bar coded medium indicative of condition of film in the cartridge and implementing a predetermined control effect on the film loading operation dependent on the initial angular setting to thereby prevent double exposure after the film is loaded into the camera.

BRIEF DESCRIPTION OF THE DRAWINGS

In the drawings:

FIG. 4 is a chart of various binary codes useful in explaining the operation of the invention; and FIG. 5 is a chart of spatial bar codes corresponding to the binary bar codes of FIG. 4.

DETAILED DESCRIPTION

Figure 1:
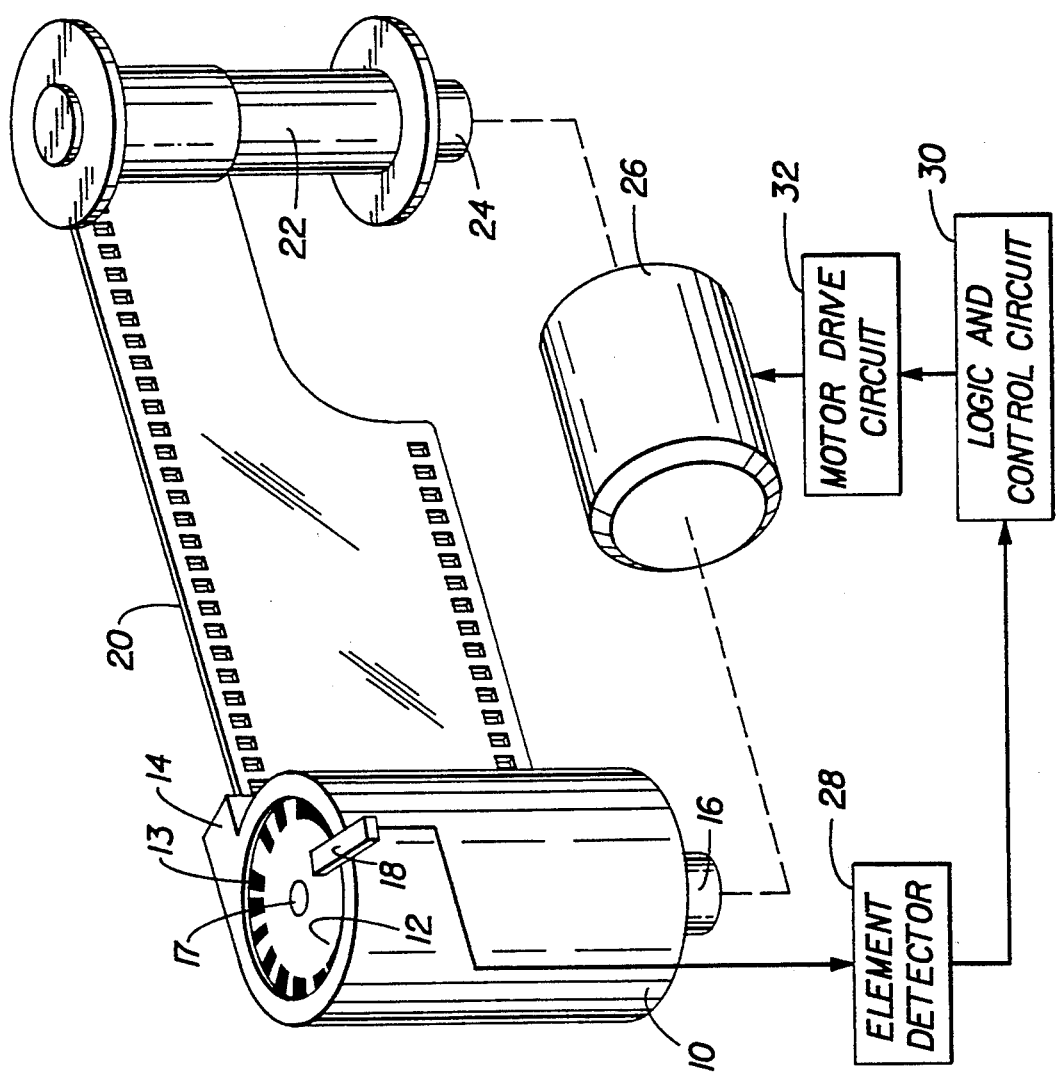
FIG. 1 is a schematic of portions of camera apparatus embodying the present invention.

Referring now to FIG. 1, a photographic film cartridge 10 is positioned in conventional manner in a cartridge receiving chamber of a camera (not shown) such that a film strip 20 extends past a film exposure gate (not shown) to a film takeup spool 22. The cartridge is preferably of the thrust type in which the film is normally entirely enclosed within the light-tight housing of the cartridge prior to being loaded into the camera. The film is wound onto an internal film spool provided with a drive end 16 which is detachably coupled to a drive motor 26. During a normal film loading operation, motor 26 is activated in known manner by motor drive circuit 32 under the control of logic and control circuit 30 to rotate the film spool in the unwinding direction to thrust the film 20 out the exit 14 of the cartridge toward the takeup spool 22.

Figure 2A:
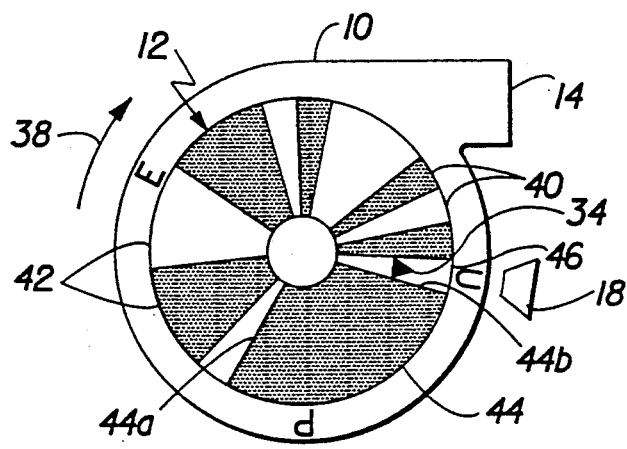
FIG. 2(a)-2(c) are schematic illustrations of three different settings of a bar coded medium on a film cartridge which are useful in explaining the operation of the present invention.

An externally readable bar coded medium comprises disc 12 which is rotatable with the film spool 17. A radial bar code 13 thereon contains machine readable data concerning the characteristics of the film in the cartridge. As shown in FIG. 2(a), the radial bar code is conventionally comprised of a data segment consisting of a series of wide and narrow elements 40 and 42, respectively, and a synchronizing segment consisting of an extended "quiet zone" element 44 and a narrow "start" element 46. In the particular illustrated embodiment, an interleaved "2-of-5" code format is employed which consists of two character codes, one represented by solid bars and the other by open spaces. Each character code consists of two wide elements, representing binary "ones", and three narrow elements, representing by binary "zeros". Thus, in the illustrated embodiment, the data segment always consists of a total of ten code elements although the distribution of wide and narrow elements within the data segment will vary with the particular character codes being represented. While a 2-of-5 code format is described herein for illustrative purposes, it will be appreciated that other code formats may be used.

Figure 2B:
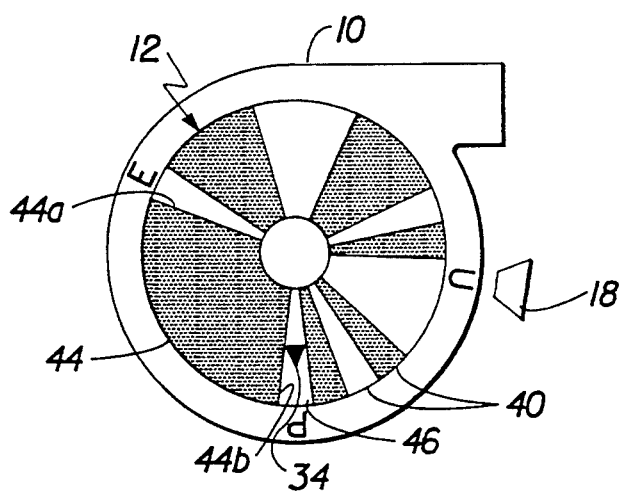
Figure 2C:
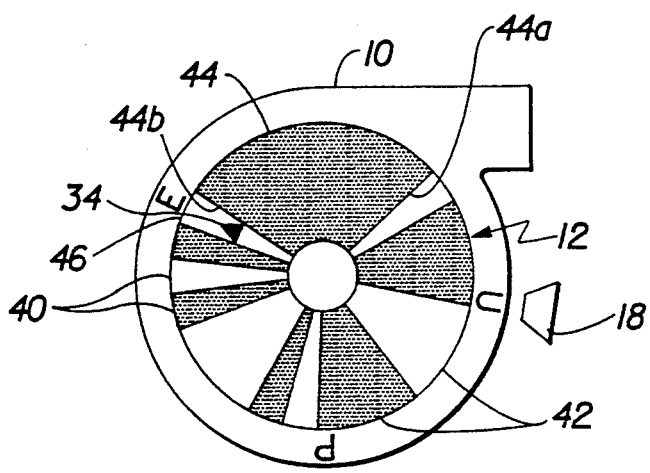

An optical bar code sensor 18 is located in the cartridge receiving chamber to sense the elements of the bar code in known manner as the disc rotates in association with the film spool during film loading (unwinding) and film unloading (rewind) operations. The signal from sensor 18 is processed by element detector circuit 28 and fed to logic and control circuit 30 for use in performing suitable control functions in the camera. A series of visual exposure indicator (VEI) positions, represented by indicia "U","P","E", are peripherally spaced around the end of the cartridge housing 10 and an arrow mark 34 is provided on disc 12 within the start element 46. As described in aforementioned U.S. Pat. No. 5,032,854, the angular (rotational) positioning of film spool 17 and the bar code disc 12 is preset, either initially by the film manufacturer or subsequently by suitable control means in the camera at the end of a film rewind operation, such that the alignment of arrow 34 on disc 12 with the appropriate one of the peripheral VEI positions on cartridge housing 10 visually indicates to the camera user the exposure condition of the film in the cartridge. For example, if the film is newly purchased, arrow 34 would be in alignment with the letter "U", as shown in FIG. 2(a). If the film is partially used or fully exposed, the arrow would align with the letter "P" or "E", as shown in FIGS. 2(b) and 2(c) respectively.

Although alignment of visually observable indicators on the cartridge is useful to the camera user in providing an indication of film exposure condition, the capability of determining within the camera the rotational angular setting of the bar coded disc itself is equally important to provide automatic control of the film loading operation. To do this, it is necessary to determine angular position of some reference position on the disc 12, such as the start of the quiet zone, relative to a fixed reference position on the cartridge 12. While any combination of disc and cartridge housing fixed reference positions can be envisioned, it is convenient to illustrate the reference cartridge position as being the "U" VEI position with the bar code sensor 18 in the camera cartridge receiving chamber being aligned with this position. Thus during the initial clockwise rotation of the spool, indicated by arrow 38, as the film is unwound for loading into the camera, the number of degrees of rotation of the bar code disc until the beginning of the quiet zone element passes under the sensor 18 can be calculated by logic and control circuit 30 to determine the initial setting of the bar code disc. In the aforementioned '854 patent, the angular setting of the radial bar code disc is determined by measuring the element widths while reading the bar code and adding up the number of degrees until the start of the quiet zone is sensed. While reasonably effective for the purpose, it has been found to be desirable to avoid relying on reading bar code element widths as a measure of angular displacement because of the difficulties associated with accurately reading the widths during the initial rotation of the spool due to motor and film start up inconsistencies.

To this end, the initial angular setting of the bar code disc can be determined when the spool is initially rotated in the unwinding direction during motor startup by accumulating a count of the number of bar code elements that pass under the optical sensor between the at-rest position of the disk and a predetermined reference position on the disk. This reference may conveniently be the quiet zone element 44 in the synchronizing segment that delineates the space between the end and start position of the bar code data segment, although any other fixed reference position in the disk may be utilized. Thus in the illustrative example of FIG. 2(a), when the disc rotates clockwise in the unwinding direction during film loading, the sensor 18 will "see" a full complement of ten bar code data elements 40 and 42 up until the point at which the leading edge 44a of the quiet zone element 44 passes under the sensor. As will be described subsequently, logic and control circuit 30 is programmed to recognize this count as falling within a range of counts that indicates that the film is unexposed and will allow the loading of the film into the camera to proceed. In FIG. 2(b), wherein the at-rest position of the disc 12 is set with the indicator arrow 34 set to the VEI indicator "P", the sensor will "see" six elements before the quiet zone is reached. Logic and control circuit 30 will recognize this element count as falling within a range of counts indicating that the film is partially exposed and, assuming the camera is mid-roll interrupt (MRI) capable, will implement MRI control of the loading process to advance the film to the next available unexposed frame position on the film strip 20. If the camera is not MRI-capable, circuit 30 will terminate the loading operation and reverse the motor drive to return the film to the cartridge. In FIG. 2(c), the sensor will "see" only one element before the quiet zone. Circuit 30 will recognize this as falling within a range of counts indicating that the film in the cartridge is fully exposed and will terminate the loading process and rewind the film back into the cartridge.

Figure 3:
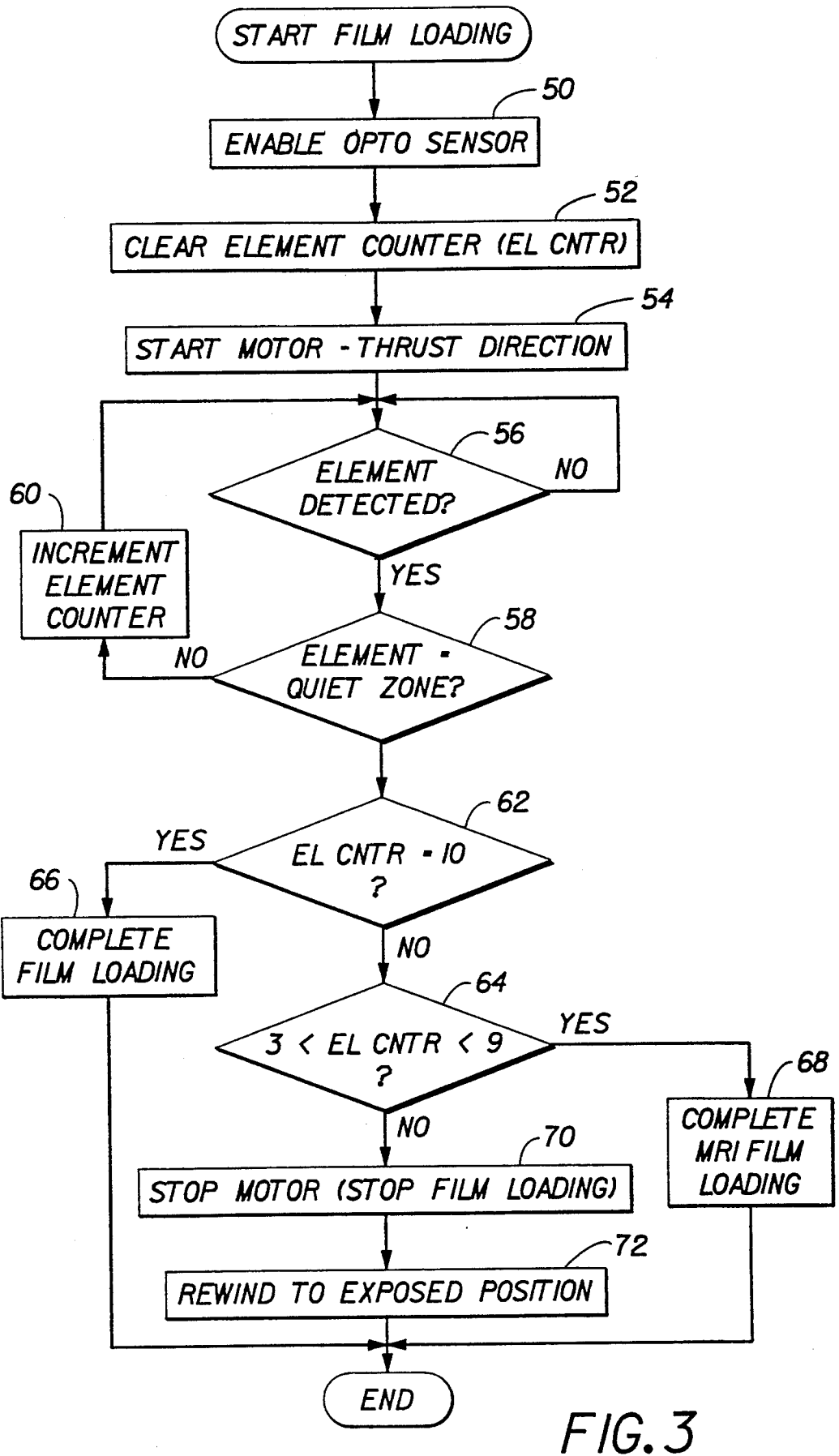
FIG. 3 is a program flow chart for control logic of a camera embodying the present invention.

The manner in which logic and control circuit 30 may be programmed to operate in the manner described above is illustrated in the program flow chart of FIG. 3. At the start of film initialization, which may be started when the camera is closed after inserting the film cartridge into the receiving chamber, the logic and control circuit 30 responds sequentially to program instructions 50, 52 and 54 to enable the opto sensor 18, clear an element counter and start motor 26 to begin thrusting of the film out of the cartridge 10. The output of element detector 28 is then monitored to determine in query 56 when an element is detected. Query 58 checks to see if the detected element is the quiet zone element 44 and, if not, instruction 60 increments the element counter. Detection of quiet zone element 44 may be accomplished in a manner taught in commonly assigned U.S. Pat. No. 5,032,854, the disclosure of which is incorporated herein by reference. Once the quiet zone element 44 is detected, the element counting is stopped and the accumulated count is compared by queries 62 and 64 with a plurality of predetermined ranges of element counts, as in a look-up table. If query 62 determines that the accumulated count falls in a first predetermined range of element counts corresponding to the "unexposed" VEI setting "U", instruction 64 conditions the control circuit 30 to complete the film loading into the camera. In this example, the range is a single element count range equal to "10" although conceivably a range of element counts might signify the "U" VEI setting. If the count is outside the unexposed range, i.e. less than 10, query 64 determines whether the accumulated element count is in a second predetermined range, less than 9 and greater than 3, corresponding to the "MRI" or partially exposed VEI setting "P". If so, and assuming the camera is an MRI capable camera, the control circuit 30 initiates MRI film loading which operates to continue the film loading sequence and positions the next available unexposed frame location on the film within the film gate. If query 64 determines the element count is not in the MRI range (or if the camera is not MRI capable) instruction 70 causes logic and control circuit 30 to stop the motor and terminate film loading and instruction 72 reverses the motor to rewind the film into the cartridge and set the disk 12 with the indicator 34 aligned with the exposed indicator "E" on the cartridge housing.

It will be appreciated that this technique of basing the loading control on the count of bar code elements, rather than by measurement of degrees of displacement, is based on the assumption that the number of degrees between the visual exposure indicator (VEI) positions on the cartridge (and corresponding angular settings of the bar code disc) for given characteristics of the bar code are such as to provide discrete ranges of element numbers or counts for each VEI setting that do not overlap thereby providing an unambiguous indication of the setting of the bar code disc. This will now be considered in more detail.

The characteristics of bar codes in general are such that for a given bar code format, as would be used with a photographic film cartridge, the code portion representing variable data concerning the film (i.e. excluding the quiet zone and start element) will always be of a fixed aggregate length. However, the combinations of narrow and wide elements will vary with the data represented. Thus, for any given number of elements within the data portion, the angular displacement occupied by these elements will vary with the data content of the code. As a result, for any given angular distance within the code, such as the distance between successive VEI positions on the cartridge, a range of element counts can exist within that distance. This can be seen with reference to FIGS. 4 and 5 wherein a variety of bar codes representing different data characters are presented; the binary representations being shown in FIG. 4 and the corresponding spatial representations, i.e. the actual bar codes spread out linearly, being shown in FIG. 5.

In this example, the data portion of the disc is comprised of an interleaved "2 of 5" character pair with an extended quiet zone 44 (FIG. 2) and a "start" element 46 that signifies the beginning of the data portion. In the data portion, the white elements (indicated by clear spaces in FIG. 5) comprise one character sequence and the interleaved dark elements (represented by lined segments in FIG. 5) represent the other character. The wide elements, 40.5° in width, are arbitrarily assigned a binary value of "one" and the narrow elements a "zero" value. The narrow elements are one-third the width of the side elements, i.e. 13.5°. It will be appreciated that these angular widths are exemplary only and that other width combinations may be used.

In FIG. 5, arrow 80 indicates the sequential direction in which the bar code elements pass under the optical sensor 18 during clockwise rotation of the film spool and the disc 12 which is the unwinding, film thrust direction of rotation. When the disc 12 is set with the VEI indicator arrow 34 aligned with the first VEI position "U", optical sensor 18 is positioned relative to the disc bar code as shown by the "U" notation: that is, aligned with the "start" element 46 on the disc. Thus, it is apparent that when the spool is initiated into the unwinding direction of rotation, a total of ten elements will always be sensed before reaching the quiet zone 44 thereby indicating that the film is unexposed and allowing film loading to continue as described in connection with the program of FIG. 3. If the disc were set with arrowhead 34 aligned with the second VEI position "P" on the cartridge, the sensor 18 would be positioned relative to the disc bar code as shown by the "P" notation. It can be seen that sensor 18 will now detect one of a range of possible element counts between a maximum of eight and a minimum of four. Correspondingly, if the disc is set with indicator 34 at the third VEI position "E", the relative position of sensor 18 to the disc bar code is such that it will detect a range of counts of from one to three elements, depending on the code contents. Thus with a predetermined angular spacing of the three VEI indicator position "U", "P" and "E", it is possible to determine the initial setting of the disc 12 by simply counting the number of the elements sensed during initial spool rotation until the reference position, e.g. beginning of the quiet zone is detected.

The angular spacings between the VEI positions on the cartridge to allow the unique ranges of element counts can be readily determined by relating angular position of each of the VEI positions to both the ratio of the widths of the wide to narrow elements and the code format. Typically, the first position "U" would be set to correspond to the maximum number of data elements in the bar code format. This would represent a position on the disc ten elements away from the end of the quiet zone 44 (in the 2/5 code format of FIG. 5). For a three VEI position cartridge represented by the solid line sensor 18 relative positions shown across the top of FIG. 5, the second VEI position "P" is spaced from "U" by two wide element lengths (81°). Thus the highest count that would be sensed during film thrust is eight. The lower limit of element count for the "P" range by knowing the number of narrow elements which fit into the number of wide elements for the first VEI position (two) and subtracting from the total number elements in the data segment of the code:

$$\text{Lowest Cnt. Lim.} = TE - \frac{WR}{WN}$$

where:
TE is the total number of elements in the data segment
WR is the width in degrees of the data segment reserved for prior VEI position(s)
WN is the width in degrees of a narrow element
Thus for the example of three VEI positions with 81° (two wide elements) reserved for the "U" position:

$$\text{Lowest Cnt. Lim.} = 10 - \frac{81°}{13.5°} = 4$$

Thus the range of element counts for the second VEI "P" is from 8 to 4 and the remaining count range is less than 4. This can be seen in the FIG. 5 illustration.

The foregoing description applies to a cartridge having three VEI positions. It is possible with a ten element bar code to provide four VEI positions as illustrated by the sensor 18' positions relative to the bar code disc illustrated at the bottom of FIG. 5. With a single wide element space (40.5°) reserved for the "U" position, the lower limit count for the second, "P", position is determined by the above method to be 7. Thus a sensed element count of from 7 to 9 would indicate the disc was set at the "P" VEI position. For there to be no ambiguity in element counts between the second and third VEI positions, "P" and "E", the upper limit for the third position range must be no more than one less than the lower limit count range for the second position, i.e. 6. The minimum angular space for this position from the start 44a of the quiet zone element is then 81° (6 times the angular space of a narrow element). The corresponding element count for this space is determined by dividing this minimum angular space by the space of two wide elements giving a lower limit of two elements and an upper limit of 6 elements for this VEI position. Obviously, a count less than 2 indicates the fourth VEI position "D" which might be used to indicate that film in the cartridge has previously been developed.

In the embodiment illustrated and described above, the element counting function is performed when the spool is initiated in the film unwinding, i.e. thrust direction. It will be understood that the element counting function can be similarly in a camera programmed to cause initial spool rotation to occur in the film rewind direction. In this instance, the reference position on the disc could be the leading edge 44b of the quiet zone element 44a and the count ranges would be adjusted to take into account the existence of the extra start element 46. Moreover, assuming appropriate positioning of the VEI indicators on the cartridge housing 10, the element counting could be performed with the same cartridge design in either type of suitable programmed camera, either initial unwind or initial rewind.

It will now be appreciated that what has been described is a camera/cartridge apparatus and a method of operating a camera for preventing double exposure of film that operates from a bar code data disc on the cartridge without requiring that the disc be rotating at a fixed speed and does not require critical measurement of bar widths during spool rotation.

What is claimed is:

1. Camera apparatus for preventing double exposure of film contained in a cartridge of the type having a light-tight housing with a fixed reference position thereon, a rotatable film spool and an externally readable bar coded medium rotatable with the spool, an initial angular setting of the bar coded medium relative to the fixed reference position on the cartridge housing being indicative of an exposure condition of the film in the cartridge, the camera apparatus comprising:
 a film cartridge receiving chamber;
 an optical bar code sensor located in the cartridge receiving chamber at a predetermined angular position relative to the reference position on the cartridge housing when the cartridge is placed in the receiving chamber;
 means for initiating rotation of the spool as part of a film loading operation in the camera;
 means responsive to the bar code sensor when said rotation is initiated for counting the number of radial bar code elements occurring between said sensor and a predetermined reference position on the bar coded medium;
 means for determining from said element count the initial angular setting of the bar coded medium relative to the fixed reference position on the cartridge housing; and
 means for implementing a predetermined control effect on the film loading operation dependent on said initial angular setting of the bar coded medium,
 whereby positioning of an exposed frame on the film in a film exposure chamber of the camera is prevented.

2. Camera apparatus of claim 1 in which said initial rotation is in an unwinding direction.

3. Camera apparatus of claim 1 in which said initial rotation is in a winding direction.

4. A method of automatically sensing an initial angular setting of a rotatable bar coded medium on a film cartridge in a camera to prevent double exposure of film in the cartridge after loading into the camera, the method comprising:
 initiating rotation of the bar coded medium as part of a film loading operation in the camera;
 sensing bar code elements of the bar coded medium when said rotation is initiated and counting the number of elements sensed until a predetermined reference position on the bar coded medium is reached; and
 determining from said element count an initial angular setting of the bar coded medium indicative of condition of film in the cartridge; and
 implementing a predetermined control effect on the film loading operation dependent on said initial angular setting of the bar coded medium, whereby to prevent said film double exposure after the film is loaded into the camera.

* * * * *